US008336078B2

(12) United States Patent
Dixit et al.

(10) Patent No.: US 8,336,078 B2
(45) Date of Patent: Dec. 18, 2012

(54) ROLE-BASED ACCESS IN A MULTI-CUSTOMER COMPUTING ENVIRONMENT

(75) Inventors: Royyuru Dixit, Wilmington, MA (US); Joseph Edward Hafeman, Holliston, MA (US); Paul Michael Vetrano, Franklin, MA (US); Timothy Prentiss Spellman, Framingham, MA (US)

(73) Assignee: FMR Corp., Boston, MA (US)

( * ) Notice: Subject to any disclaimer, the term of this patent is extended or adjusted under 35 U.S.C. 154(b) by 1233 days.

(21) Appl. No.: 11/484,842

(22) Filed: Jul. 11, 2006

(65) Prior Publication Data

US 2008/0016580 A1 Jan. 17, 2008

(51) Int. Cl.
*H04L 29/06* (2006.01)

(52) U.S. Cl. .......................................................... 726/1

(58) Field of Classification Search ....................... 726/1
See application file for complete search history.

(56) References Cited

U.S. PATENT DOCUMENTS

| | | | | |
|---|---|---|---|---|
| 5,265,221 | A | 11/1993 | Miller | 395/725 |
| 5,911,143 | A * | 6/1999 | Deinhart et al. | 1/1 |
| 6,807,636 | B2 * | 10/2004 | Hartman et al. | 726/14 |
| 6,871,231 | B2 | 3/2005 | Morris | |
| 6,917,975 | B2 | 7/2005 | Griffin et al. | |
| 6,985,946 | B1 | 1/2006 | Vasandani et al. | |
| 7,185,192 | B1 * | 2/2007 | Kahn | 713/155 |
| 7,219,234 | B1 * | 5/2007 | Ashland et al. | 713/182 |
| 7,451,477 | B2 * | 11/2008 | Griffin et al. | 726/1 |
| 7,650,505 | B1 * | 1/2010 | Masurkar | 713/176 |
| 7,685,430 | B1 * | 3/2010 | Masurkar | 713/182 |
| 7,774,827 | B2 * | 8/2010 | Kinser et al. | 726/3 |
| 2002/0178119 | A1 | 11/2002 | Griffin et al. | |
| 2003/0046576 | A1 | 3/2003 | High, Jr. et al. | 713/200 |
| 2003/0229623 | A1 | 12/2003 | Chang et al. | 707/3 |
| 2004/0006593 | A1 | 1/2004 | Vogler et al. | |
| 2004/0162894 | A1 | 8/2004 | Griffin et al. | 709/223 |
| 2004/0162906 | A1 | 8/2004 | Griffin et al. | |
| 2006/0047657 | A1 | 3/2006 | Frieder et al. | |

FOREIGN PATENT DOCUMENTS

| | | |
|---|---|---|
| EP | 0 697 662 | 2/1996 |
| EP | 1 081 576 | 3/2001 |
| WO | 2004/107703 | 12/2004 |

OTHER PUBLICATIONS

Sandhu et al., "Role-Based Access Control Models," 1996 IEEE.

* cited by examiner

*Primary Examiner* — Edan Orgad
*Assistant Examiner* — James Turchen
(74) *Attorney, Agent, or Firm* — Proskauer Rose LLP

(57) ABSTRACT

An actor is associated with a role, a policy type is associated with the role, and a role scope is associated with the role. One or more values are received for one or more corresponding context parameters associated with the actor. A request for access to a resource is received from the actor. A policy instance is determined based on the policy type and the one or more values for the one or more corresponding context parameters associated with the actor. One or more actor-role scope values are determined based on the role scope and the one or more values for the one or more corresponding context parameters associated with the actor. A response to the request is determined based on the policy instance and the actor-role scope values.

20 Claims, 7 Drawing Sheets

300

304

500

600

700

ROLE-BASED ACCESS IN A MULTI-CUSTOMER COMPUTING ENVIRONMENT

FIELD OF THE INVENTION

The present invention relates to role-based access in multi-customer distributed and/or centralized computing environments.

BACKGROUND

Corporate employees and customers need access to systems resources and applications in secure and reliable environments. The administration and control of access to such resources is made more challenging with the growing trend toward corporate employee and customer turnover, the use of temporary contract personnel as a core supplement to a corporation's workforce, the continuous installation of new applications, as well as updates to and the removal of existing applications from corporate networks. Security administration has become an increasingly more complex and expensive aspect of the management of large enterprise networks given these trends.

Role-based access control ("RBAC") technologies and methods have evolved from the research and development efforts of the United States Department of Defense, as well as David Ferraiolo and Richard Kuhn, among others, in response to the growing challenge of security administration. Role-based access control has emerged as one of the accepted models for security administration in large, networked computing environments. RBAC technology is being developed and deployed in areas such as defense, health care, as well as banking and finance.

Role-based access control entails the categorization of computer system users into roles. A role is, for example, a construct that is created by a systems administrator according to, for example, the job functions performed by users within an organization. Computer system users can be assigned to roles on the basis of their particular job responsibilities and qualifications. Users are not assigned access permissions directly. Instead, roles are granted various permissions or access authorizations to data and/or systems resources based on the authority and responsibility conferred upon users that are assigned to these roles. Roles allow for an additional level of abstraction that facilitates security administration at the enterprise-level rather than at the user-level, in part, because the mapping of roles to permissions is more stable than the mapping of users to roles. The latter mapping changes each time a user is added or removed from the system, changes job functions, or is promoted. These changes are more frequent than those in the role-to-permission mapping. Role-to-permission mapping is typically driven by changes in business policies. Such business policies typically change less frequently than changes to the job functions of users. Thus, the use of role-based access control models can simplify the task of administering authorization and permission policies. There are, however, limits to this simplification. In large computing environments, the number of roles may be in the thousands. Management of these large number of roles and maintenance of user-role mappings can be arduous, expensive, and time-consuming.

More rigorous RBAC models have been introduced that employ, for example, role hierarchies where roles can inherit permissions from other roles. RBAC models that involve the imposition of restrictions on policy and access configurations also exist. One of the more common restrictions or constraints is represented by mutually exclusive roles, where the same user can be assigned to only one role among a mutually exclusive group of one or more roles. There are RBAC models that employ the notion of prerequisite roles where a user may only be assigned to role "A" if he is already assigned to role "B."

Though these more rigorous RBAC models provide an adaptive means of enforcing security policies at the enterprise-level, the extent to which such models have allowed for reduced complexity, increased scalability, and true flexibility in the process of security administration has been limited. Defining roles and permissions sufficiently and assigning appropriate user-role associations within an enterprise with a heterogeneous IT infrastructure continues to be extremely complex and costly. The application of role-based access control models to administer user entitlements across multiple applications and computing environments remains a challenge.

SUMMARY OF THE INVENTION

In one aspect, there is a method for managing role-based access in a multi-customer computing environment. An actor is associated with a role, a policy type is associated with the role, and a role scope is associated with the role. One or more values are received for one or more corresponding context parameters associated with the actor. A request for access to a resource is received from the actor. A policy instance is determined based on the policy type and the one or more values for the one or more corresponding context parameters associated with the actor. One or more actor-role scope values are determined based on the role scope and the one or more values for the one or more corresponding context parameters associated with the actor. A response to the request is determined based on the policy instance and the actor-role scope values.

In other examples, one or more of the following features can be included. In response to the request a resolved scope can be determined using the actor-role scope values. A role assignment record can be generated. The role assignment record can include the actor, the role, and/or the context parameters. The role assignment record can include the one or more actor-role scope values based on the role scope. The resource can include a database, a system application, a document, or any combination thereof. The actor can include a user, a system account, a system application, a computing device, or any combination thereof. The policy type can include an access control policy element, a data view/presentation policy element, a function performance/update operation policy element, or any combination thereof. Determining the policy instance can include employing a hierarchical priority of the one or more of the context parameters. A default policy instance can be defined. The default policy instance can be selected when there is no match with the one or more of the context parameters.

In another aspect, there is a system for managing role-based access in a multi-customer computing environment. The system can include one or more servers configured to perform any of the methods described herein. In another aspect, there is a computer program product, tangibly embodied in an information carrier, for managing role-based access in a multi-customer computing environment. The computer program product includes instructions being operable to cause data processing apparatus to perform any of the methods described herein.

Any of the above examples can realize on or more of the following advantages. By using context parameters for role assignment, policy instance determination, and/or scope resolution, fewer roles are needed to handle diverse situations. Further, the same roles can be used across multiple customers in a multi-customer environment. For example, one manager role can be used for ABC Corp. and XYZ Corp. in the same computing environment because context parameters allow determination of different authorization policies for the same manager role for the two different corporations. The role-based authorization system provides for a more rich definition of authorization than is set forth as part of industry standards such as the RBAC model of the NIST, for example American National Standard ANSI INCITS 359-2004. Through inclusion of contextual considerations and actor attributes such as scope, access control, presentation, and function, the role-based authorization system enables efficient and scalable role-based authorization in a multi-customer computing environment.

BRIEF DESCRIPTION OF THE DRAWINGS

The advantages of the invention described above, together with further advantages, may be better understood by referring to the following description taken in conjunction with the accompanying drawings. The details of one or more examples are set forth in the accompanying drawings and the description below. Further features, aspects, and advantages of the invention will become apparent from the description, the drawings, and the claims. The drawings are not necessarily to scale, emphasis, instead, generally being placed upon illustrating the principles of the invention.

DESCRIPTION OF THE INVENTION

Figure 1:
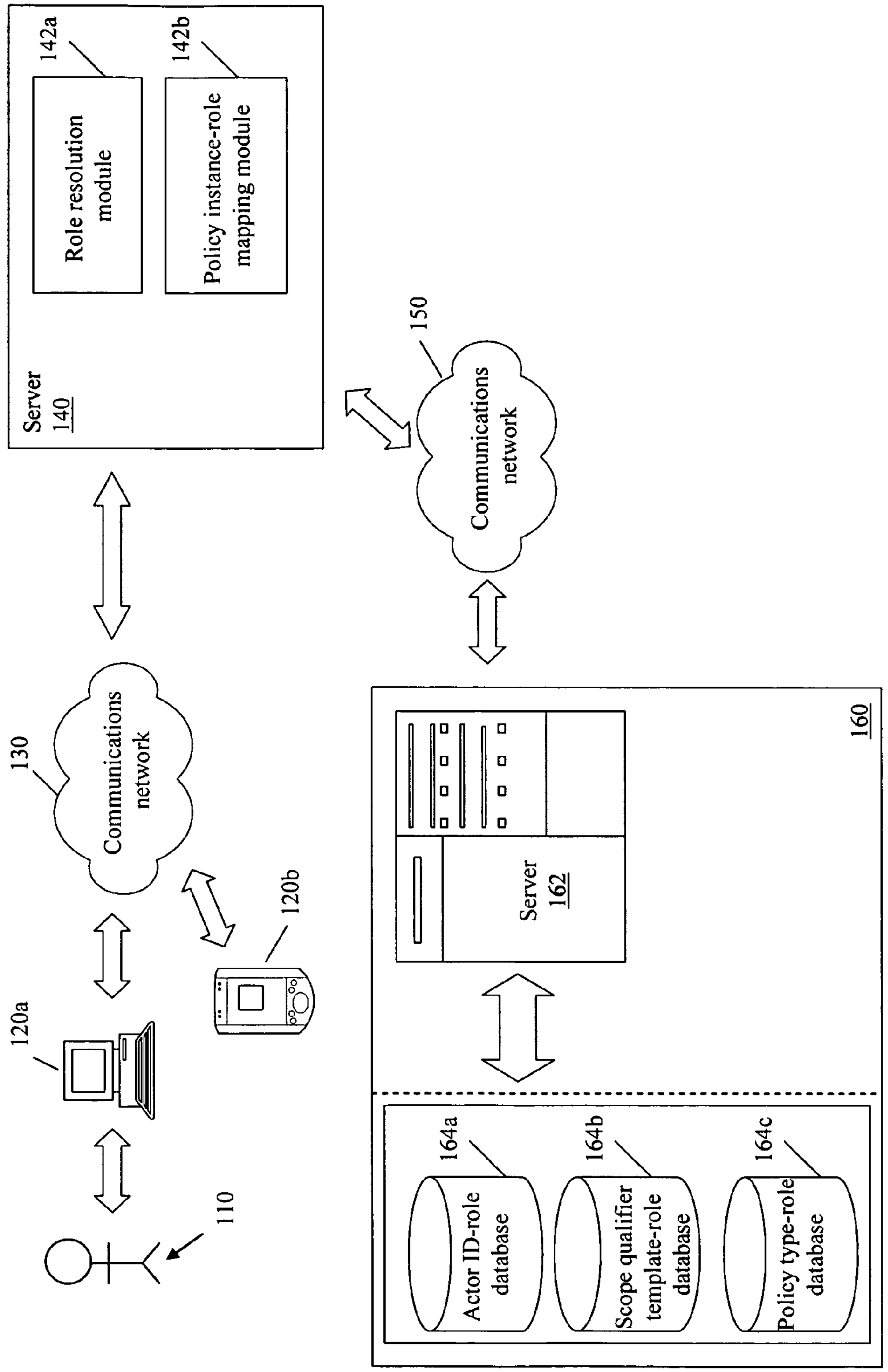
FIG. 1 is an exemplary illustration of a computing system for role-based access in a multi-customer computing environment.

FIG. 1 illustrates an exemplary computing system 100 for role-based access in a multi-customer computing environment, The computing system 100 performs these functions by operating on input data and generating output data. A user 110 interacts with the client device 120. The computing system 100 can include one or more client-computing devices, for example, a desktop computer 120*a* and/or a handheld computing device, e.g., a personal digital assistant 120*b*, generally 120. The client-computing device 120 is in communication with a communications network 130. The communications network device 130 enables communication between the client device 120 and an application server 140 by, for example, transmitting data and executing instructions between the client device 120 and an application server device 140. The application server 140 receives service requests from one or more of the client devices 120 through the communications network 130. The application server 140 executes one or more application software program modules, including, for example, a role resolution program module 142*a*, and/or a policy instance-role mapping program module 142*b*, generally 142. An exemplary function of the role resolution program module 142*a* can be associating a role with an actor based on one or more pre-defined context parameters, and resolves the authorized scope of action for the user. An exemplary function of the policy instance-role mapping program module 142*b* can be assigning a policy instance to a role based on one or more pre-defined context parameters and one or more policy types. A policy type includes, for example, one or more policy elements that relate to one or more user authorizations or permissions. A policy instance is an instance of a policy type (e.g., a predetermined set of values for a predetermined set of policy elements) that applies to a user based on the role of the user and the one or more pre-defined context parameters associated with the user.

The application server 140 accesses one or more database servers 162 through a communications network 150. In some examples, the communications network 130 and the communications network 150 are the same network. The application server 140 serves client requests by, for example, generating the appropriate response back to the appropriate client device 120 based on outputs from the one or more application software program modules 142. The database server 162 creates, stores, organizes, and retrieves data from one or more databases. In one embodiment, databases include, for example, an actor ID-role table 164*a*, a role scope-role table 164*b*, a policy type-role table 164*c*, and/or any combination thereof, generally 164. In some embodiments, the one or more database servers 162 are co-located with one or more database tables 164 at repository 160. In other embodiments, the one or more database servers 162 communicate with the one or more databases and their tables 164 through a communications network (not shown).

Although the examples refer to a user 110 as an actor, the invention is not so limited. A user 110 is one type of actor. Other actors can include, for example, system accounts, system applications, batch processes, and/or other computing devices. The actor includes an entity that performs one or more actions, and is the target for the authorization decision regarding access to particular resources. When one or more actors are system accounts, system applications, batch processes, and/or other computing devices, the one or more actors are in communication with an application server 140 through the communications network 130. The application server 140 receives service requests from the one or more actor devices through the communications network 130. The application server 140 executes one or more application software program modules, including, for example, a role resolution module 142*a*, and/or a policy instance-role mapping module 142*b*, generally 142. The application server 140 accesses one or more servers 162 through a communications network 150. The application server 140 serves client requests by, for example, generating the appropriate response back to the appropriate actor based on outputs from the one or more application software program modules 142.

Figure 2:
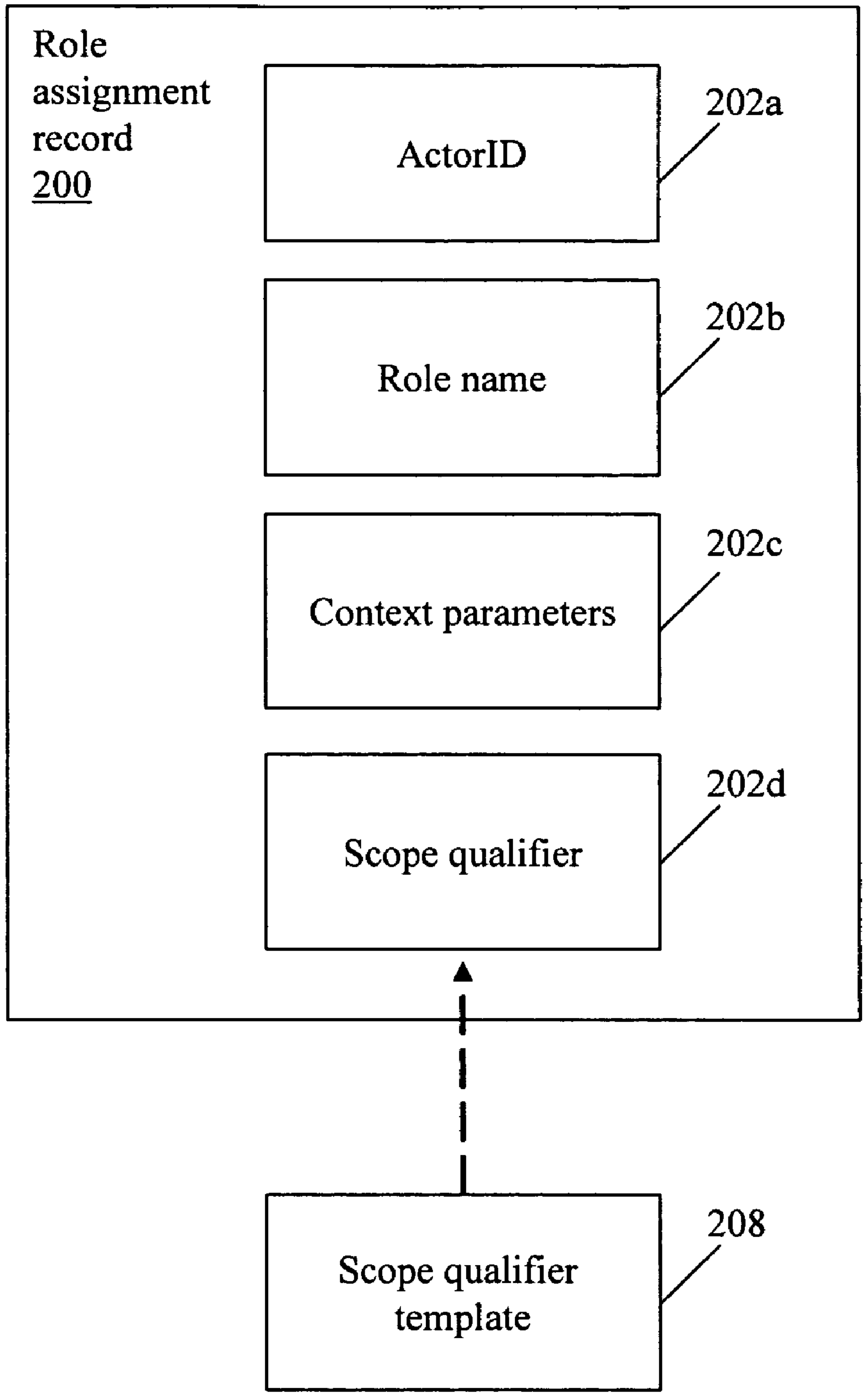
FIG. 2 is an exemplary illustration of a data structure for a role assignment record.

FIG. 2 is an exemplary illustration of a data structure for a role assignment record 200. The role assignment record 200 is one of the entities upon which authorization can be determined by the system 100. A role can represent a named container in which to assign one or more actors who, for example, can have a set of common attributes and/or a set of common permissions and capabilities. A role can be a link between actors and policy instances that enables role-based authorization. An actor can have one or more roles, and a role can have one or more actors associated with it. For example, an actor might be an employee, a manager, and/or employee benefit plan participant. In such examples, an application can use any or all of these assigned roles, however, only one of the actor roles may be in effect at any given time within the application. In such examples, the user either explicitly selects a role or the application implicitly selects a role based upon the workflow context.

Roles can form a hierarchy whereby a role can inherit and extend the permissions of another role. Associated with a role are one or more policy instances that, in conjunction with the scope associated with the role of a user, specify which resources the actor can access and the extent of the resource access. Role assignment is based, in part, on one or more context parameters. For example, an actor has the role of "manager" based upon the fact that a given business entity employs the actor in a managerial capacity within a given organization (e.g., the organization being an exemplary context parameter). Alternatively, that same actor can have the role of "plan participant" if the actor is, for example, acting in the context of an organization that is a client to a retirement or benefits plan administrator (e.g., communicates with the system through a Web interface for the particular retirement plan).

Role assignment includes the creation of a role assignment record 200. A role assignment record includes, for example, an actorID 202*a*, the name of the role 202*b*, context parameters 202*c*, and a actor-role scope 202*d*. The actorID 202*a* is the identity of the user, system account, system application, batch process, or other computing device assigned to the role. The name of the role 202*b* can be specified during the role set-up or administrative process. Role names can include, for example, "manager," "employee," "plan participant," "system administrator," and the like. Context parameters 202*c* are variables that make the role assignment unique to the actor. Context parameters can include, but are not limited to, parameters such as "client identifier," "practice identifier," "plan number," "product identifier," "market segment," and "authentication strength." For example, a user named "Bob" is assigned to the role of "manager," and has a context parameter of "client." In another example, the user named "Bob" is assigned the role of "brokerage customer" where the context parameter is "account type."

The role assignment record 200 can also include a actor-role scope 202*d*. The actor-role scope 202*d* includes a key that allows a consuming system and/or application to obtain the resolved scope of action that an actor is permitted to perform. The actor-role scope 202*d* includes one or more values applicable to a given role assignment for an actor. The actor-role scope 202*d* of the role assignment record 200 is derived from a role scope 208 by taking into account one or more pre-defined context parameters specific to an actor. A role scope 208 includes a general specification of the scope of authorized action for an actor, e.g., the definition of who and/or what can be acted upon by an actor in a particular role. For example, a role assignment record 200 can include an actorID 202*a* for the user "Bob" who serves in a role named 202*b* "manager" in the context 202*c* of "ABC Client Corporation." The actor-role scope 202*d* of the role assignment record 200 in this example is determined based on the role scope 208. In this example, the role scope 208 includes "department name." This means that during the assignment process of the user 110, "Bob," to the role named 202*b* "manager," a department name is required to resolve the scope of the "manager" role. In this example, the actor-role scope key 202*d* enables resolution of scope that includes, for example, the "purchasing department" for the department name.

Some other examples of data that can be included as role assignment elements in the role assignment record 200 are start/end date for the role, assignment status, e.g., active role available for assignment, inactive role that cannot be assigned, role grantor or proxy, owner of the role who can be responsible for definition and maintenance of the role and associated policies, a list of consumer applications that can use a given role, role assignment rules, e.g., rules related to the mutual exclusivity of particular roles for a given user, and the like.

Figure 3:
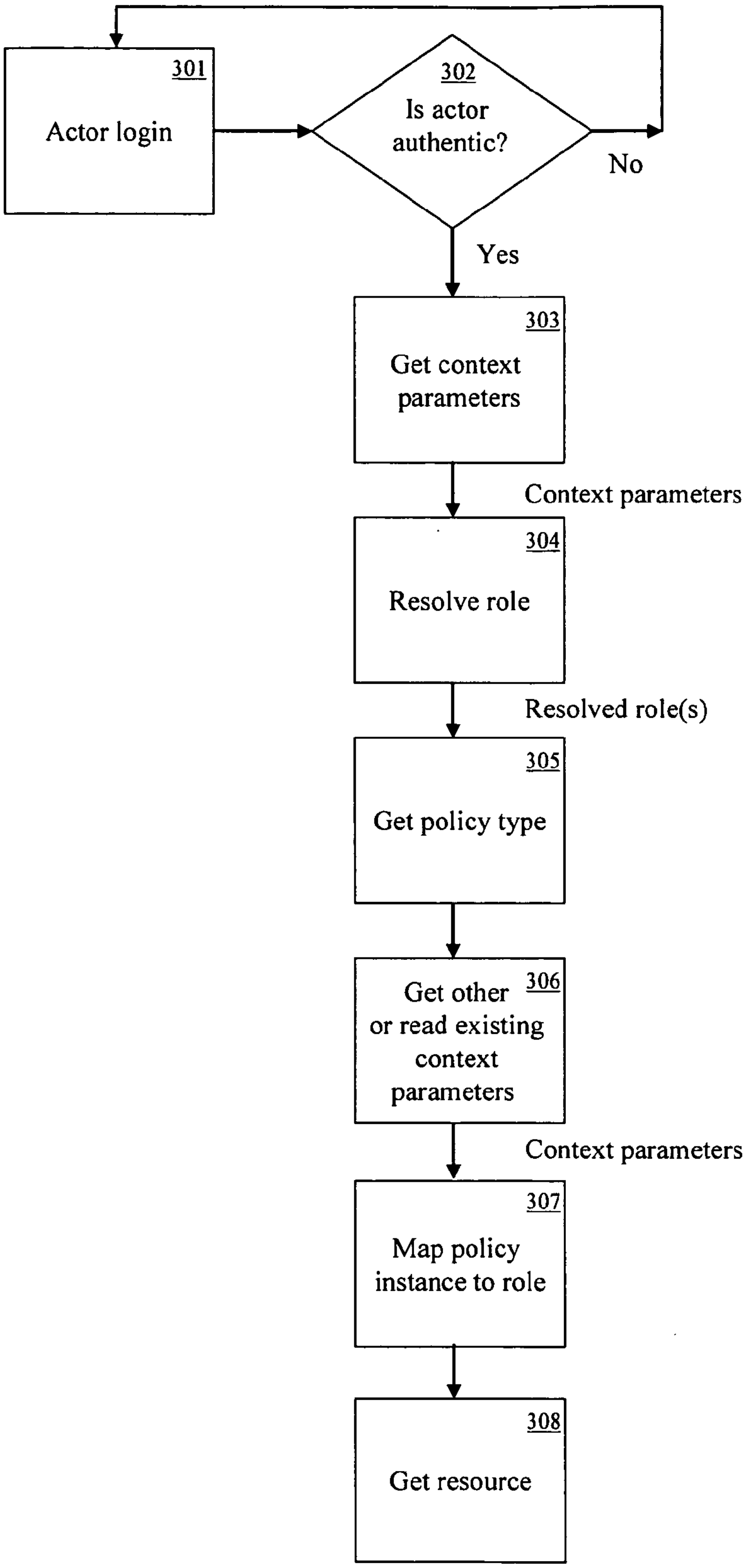
FIG. 3 illustrates a process flow diagram for role-based access in a multi-customer computing environment.

FIG. 3 illustrates a process flow diagram 300 for role-based access in a multi-customer computing environment. In the diagram 300, the user 110 (one type of actor) logs on (301) to a computer system by providing, for example, a userID and password. The identity of the user 110 is established through system verification of the authentication credentials that the user inputs into the system 100. If the user 110 is authenticated (302) by the system, then one or more pre-defined context parameters are obtained (303).

Context parameters can include one or more attributes that describe, for example, the manner and circumstance in which an actor can interact with one or more given resources. Context parameters include, for example, role-related context parameters, session-related context parameters, and/or any combination thereof. Role-related context parameters play a part in the assignment of roles, the management of policies, and the selection of policy instances. In some examples, role-related context parameters may not relate to the runtime environment of the application consuming the policy instance data. The reason for this is that actor-to-role assignment, in some examples, does not depend upon runtime factors. In such examples, the one or more pre-defined context parameters associated with role assignment focus more on organizational factors, e.g., the division in which a user is employed. Session-related context parameters can include parameters related to the interactions of the actor with a computer system. The session-based context parameters can include, but are not limited to, parameters associated with one or more consuming applications (e.g., applications that are requesting access to one or more resources), one or more points of claim, which can relate to the one or more sources of consuming application usage, alternative user authentication mechanisms and strengths associated with various access paths to one or more applications, date and/or time ranges associated with one or more policy instances, and/or any combination thereof. In some examples, session-related context parameters can be hierarchical in nature. For example, such a hierarchy can include: consuming application, point of claim, followed by authentication credential strength. In such examples, session-related context parameters provide a mechanism to apply overrides, which can occur after the application of role-related context parameters. Session-related context parameters can operate as a set of rules that are applied after the role-related context parameters are considered. In some examples, session-related context parameters will not vary, as they can be common to all consumer applications. Role-related context parameters can vary by role.

Points of claim include, for example, customer use through the Internet, customer use through a corporate LAN, third party access, and/or any combination thereof. Authentication credential strength can vary among users. For example, customers accessing applications through a typical PIN login mechanism can be authorized to access a greater number of resources than, for example, customers accessing applications through a single sign-on protocol from a corporate LAN.

The "resolve role" process 304 of FIG. 3 includes determining (304) a role associated with an actor and resolving (304) the scope of authorized action for the actor. An actor's role is determined (304) based, for example, on the identity of the actor 202*a* and the one or more pre-defined context parameters that have been obtained (303). For example, the actor can have a pre-defined context parameter of "ABC Client Corporation." Based on the actorID 202*a* and the "ABC Client Corporation" pre-defined context parameter, the actor is assigned a role of "manager" within the "ABC Client Corporation."

A policy type is associated (305) with the role of an actor. A policy type can represent a cohesive collection of one or more policy elements. Policy types are associated with roles, which can be, for example, stored in a policy type-role table 164*c*. A policy type can be associated with many roles, and a role can be associated with many policy types. A policy type can contain the policy elements that relate to a specific authorization area, such as "compensation," "time management," and/or "defined contribution exchange transactions." A policy element can include a single name/value pair that specifies a single authorization setting or decision. Policy elements can specify specific authorization elements, such as whether an actor is allowed to access (access control policy element), view (data view/presentation policy element), and/or act upon (function performance/update operation policy element) an entity, system component, and/or any combination thereof. For example, a policy type named "performance management" might include policy elements such as "access performance management application," "view compensation data," "can increase salary," "maximum salary increase percentage," and/or any combination thereof. The policy type does not have to define the policy element values. In some examples, the policy type named "performance management" would not include values, such as "yes" or "no" for policy elements such as "access performance management application," and/or "view compensation data." In such examples, defining the policy element values is the function of one or more policy instances.

Existing pre-defined context parameters are read (306) and/or one or more other pre-defined context parameters are obtained (306) to provide input into the determination (307) of one or more policy instances for each policy type associated with a role. An instance of a policy type is mapped (307) to a role based on the one or more pre-defined context parameters. A policy instance can be a specific collection of one or more policy elements with values provided for each policy element derived from the policy type and associated with the one or more pre-defined context parameters for a given role. The role, policy instance, one or more pre-defined context parameters, and the resolved scope can, for example, determine (308) the one or more resources that are accessible to the user 110. Determining user access to resources is part of the role-based authorization process.

Figure 4:
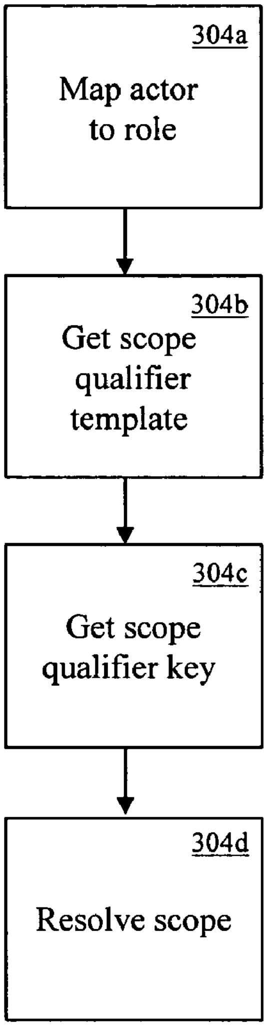
FIG. 4 illustrates a process flow diagram for role resolution.

FIG. 4 illustrates exemplary details of the process element 304 for role resolution. An actor is mapped (304*a*) to a role based on one or more pre-defined context parameters. A role scope is associated (304*b*) with a role. Such associations can be stored, for example, in the role scope-role table 164*b*. For a given role there can be one or more role scopes. A role scope can be associated with a role and used as the basis for defining the actor-role scope for a role assignment. The role scope can define the format of the actor-role scope (the actor-role scope elements) required when a user 110 is assigned to a role. The role scope includes, but is not limited to, the actor-role scope format, required actor-role scope values, optional actor-role scope values, default actor-role scope values, and/or mandatory actor-role scope values.

The actor-role scope format can describe what the actor-role scope entities are and the data types for these entities. In some examples, the role scope can flag values as "required" during role assignment. In such examples, the system 100 will not save the role assignment record 200 without these required values being populated. The role scope can define optional or wildcard values. These actor-role scope values can be optionally specified at the time of role assignment. If these values are not specified, then any value could apply for the given actor-role scope element. The role scope can define default values. These values apply if the role assignment process does not provide explicit values. The role scope can include mandatory actor-role scope values which include values that apply to every role assignment and cannot be changed. For example, the role of "employee" can have a mandatory role scope value of "self." The role assignment process may not provide a different value for this mandatory role scope value.

The actor-role scope key can be derived (304*c*) from the general specification of scope contained within the role scope associated with the role of a user 110. The actor-role scope key provides a pointer to the scope values maintained by, for example, a customer recordkeeping system. The actor-role scope key includes one or more pointers to the populations and/or entities that an actor is authorized to act upon. The scope includes the populations and/or entities themselves, which can be comprised of one or more sets of values. The actor-role scope key describes how to obtain the scope from the role-based authorization system. For example, a actor-role scope key may describe a specific location within an organization, e.g., cost center 84325, the relationship to the actor, e.g., people who report to the actor, and/or the depth of the relationship, e.g., all organizational levels down. For example, the scope associated with cost center 84325 resolves to a list of subordinate employees within the cost center that include employee numbers 003-03-0003, 002-02-0002, and 001-01-0006.

The actor-role scope key does not have to be a scalar value. The actor-role scope key can include a number of data values as previously illustrated. A actor-role scope key can resolve to one or more sets of people, but actor-role scope keys (and scope) can also resolve to entities that are not sets of people. For example, a role could "scope" an actor to a set of mutual funds. For this example, the actor-role scope key would resolve to a list of mutual funds that the actor could work on within a given application.

Actor-role scope keys can refer to a hierarchal scope structure. A scope structure can include hierarchical organizations, such as location, division, and/or department, or personnel hierarchies, such as executive, director, and/or employee, and/or any combination thereof. The ability of a actor-role scope key to resolve organizational scope could, for example, be facilitated by the following elements: a hierarchy actor-role scope, a navigation actor-role scope, and a base actor-role scope (referred to as a population group). Additional elements can also be defined as requirements dictate. Hierarchy and navigation can be used as starting points for a base actor-role scope. The hierarchy value can describe the type of hierarchy represented by the resolved scope. For example, possible values for "hierarchy" can include, "organization unit hierarchy" or "reporting hierarchy." The navigation value can describe how an actor may interact with resolved scope based on an associated hierarchy value. For example, a navigation value could include "all-levels down" and/or "same level only." Base actor-role scope values can describe one or more pointers into scope. The base actor-role scope can have values such as "work location" and/or "job grade code." In addition, base actor-role scope values can contain attributes such as inclusion and exclusion rules and values. For example, exclusions allow the system to incorporate special cases where the resolved scope for a user, for example in human resources, can include all company employees, excluding certain top-level executives. Here, the actor-role scope can be a company, so all employees are included, with an exclusion of executives X, Y, and Z.

Scope is resolved (304*d*) based on, for example, the role of an actor, one or more pre-defined context parameters, a role scope, and a actor-role scope key. Actor-role scope key values allow for determination of the resolved scope, which includes, for example, the entities, system components, or resources that a user 110 is authorized to act on when he or she is working in a specified role. There may be one scope associated with a role, though a scope may be associated with many roles. Scope can define the entities (who and/or what) the actor is allowed to act on when operating in a particular role. Resolved scope can be dynamic such that the resolved scope would not, for example, be stored by the role-based authorization system.

One possible example of the "resolve role" process 304 can include a user 110 who has a designated role of "financial manager," and a role scope that includes, for example, "department name" and "direct reports." This means that during the assignment process of a user 110 to the "financial manager" role, a "department name" and "direct reports" are required to resolve the scope of the "financial manager" role. In this example, the actor-role scope key enables resolution of scope that includes, for example, the "purchasing department" for the department name and direct reports that include, for example, "John Smith and Edward Jones." For this example, the financial manager can act on John Smith and Edward Jones who report directly to this financial manager in the purchasing department.

Figure 5:
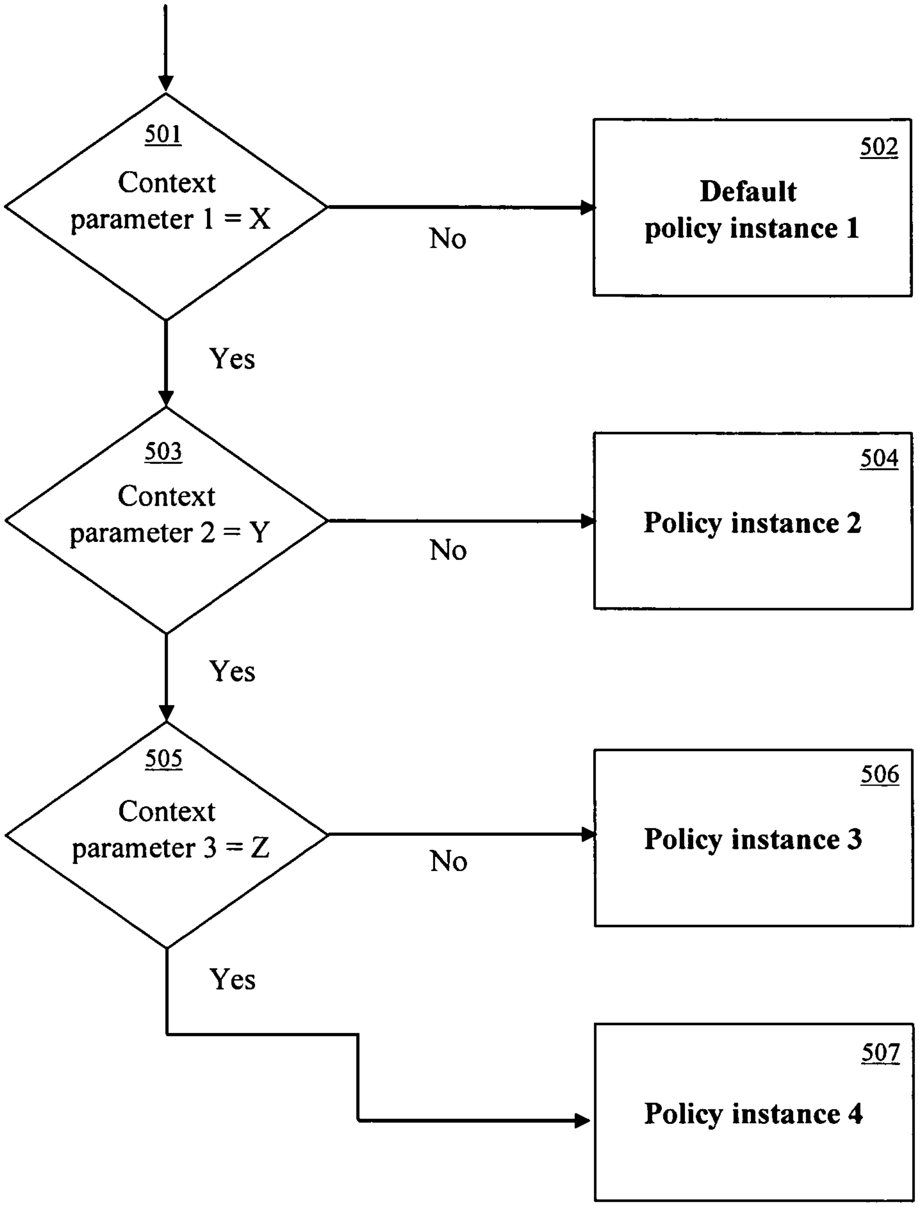
FIG. 5 illustrates an exemplary process for policy instance determination.

FIG. 5 illustrates an exemplary process 500 for determining a policy instance based on a particular role and context parameters. A policy instance can be a unique instance of a policy type. Policy instances of a given policy type differ based upon the associated role and the one or more pre-defined context parameters. A policy instance for a user 110 can be derived from, for example, the identity of the user, the role of the user, the one or more pre-defined context parameters, and/or the policy type associated with the role of the user. For a given role and one or more pre-defined context parameters there can be one or more instances of a given policy type.

Since each policy instance is based, in part, upon certain pre-defined context parameters, customized policy instances can be associated with, for example, specific ""practices," "market segments," "clients," and/or other pre-defined context parameters. The use of role-related context parameters can provide a mechanism to support policy instance customization. Session-related context parameters can add an additional level of restriction on policy instances by allowing for the application of globally limiting factors at the role level. Session-based context can include, for example, the channel used to access the application (e.g., intranet, Internet, etc.), the authentication strength, and the like.

Context parameters can be hierarchical in nature. A context parameter hierarchy can consist of, for example, a number of context parameters listed in increasing order of precedence. Each context parameter hierarchy level identifies a potential policy instance override point, e.g., 501, 503, and/or 505. Context parameter hierarchies can have a root or default level.

Policy instances can be set at one or more levels based on hierarchical context parameters that include, for example, parameters "1" (the root or default), "2," and/or "3" as shown in FIG. 5. The root level (e.g., determined by context parameter 1) can define 502 a default policy instance, (e.g., default policy instance 1) for a role. In the example illustrated in FIG. 5, default policy instance 1 can be overridden at one or more of the hierarchical levels 501, 503, and/or 505. Default policy instance 1 includes a complete definition of policy element name/value pairs. Default policy instance 1 implies the default context, that is, default policy instance 1 can match any context when no other context parameter match occurs. Policy instances at lower levels (e.g., 504, 506, and/or 507), such as policy instances 2, 3, and/or 4, can define those policy elements that override the default to a policy element value set at a higher level in the hierarchy. This allows for any changes to policy elements higher in the hierarchy to propagate downwards. A policy element for the policy type does not have to exist at each level below the root of the hierarchy. The absence of a policy element at a lower level implies the inheritance of the policy element value(s) from the next level up.

In one example, the system 100 can determine (501) whether context parameter 1 has a value of "X," which can include a parameter such as the "practice" of the user. If context parameter 1 does not have a value of "X," then the default policy instance 1 is associated (502) with the particular user. If the value of context parameter 1 is "X," then the system 100 determines whether default policy instance 1 can be overridden, and if so, by which other policy instance. The system 100 can do so by determining (503) whether context parameter 2 has a value of "Y," which can include a parameter such as the "market segment" associated with the user. If the value of context parameter 2 is not "Y," then policy instance 2 can be associated (504) with the particular user. If the system 100 determines that context parameter 2 does have a value of "Y," then the system 100 can determine (505) another potential policy instance override point. The system 100 can determine (505) whether context parameter 3 has a value of "Z," which can include a parameter such as "client." If the system 100 determines that the value of context parameter 3 is not equal to "Z," then policy instance 3 is associated (506) with the particular role. If the system 100 determines that context parameter 3 is equal to "Z," then policy instance 4 is associated (507) with the particular user. Hierarchical context parameters, for example, context parameters 1, 2, and 3 of FIG. 5, can play a part in the customization of policy instances associated with the role of a particular user. In this example, the customizable policy instances can facilitate reduction in the number of roles that have various authorizations to resources. Such facilitation can be made possible when the system 100 takes into account the one or more unique context parameters for a given user in a particular role rather than requiring that a systems administrator define numerous roles to accommodate each of the possible contextual scenarios within which the user may operate.

If a policy type, for example, "compensation," is expanded to accommodate additional functions, features, or capabilities, such as updating a salary amount for an employee, the expansion is applied to all policy instances based upon the policy type. A systems administrator may define, for example, such new policy element values at the default policy instance level. This expanded definition can automatically apply to all subordinate policy instances.

Figure 6:
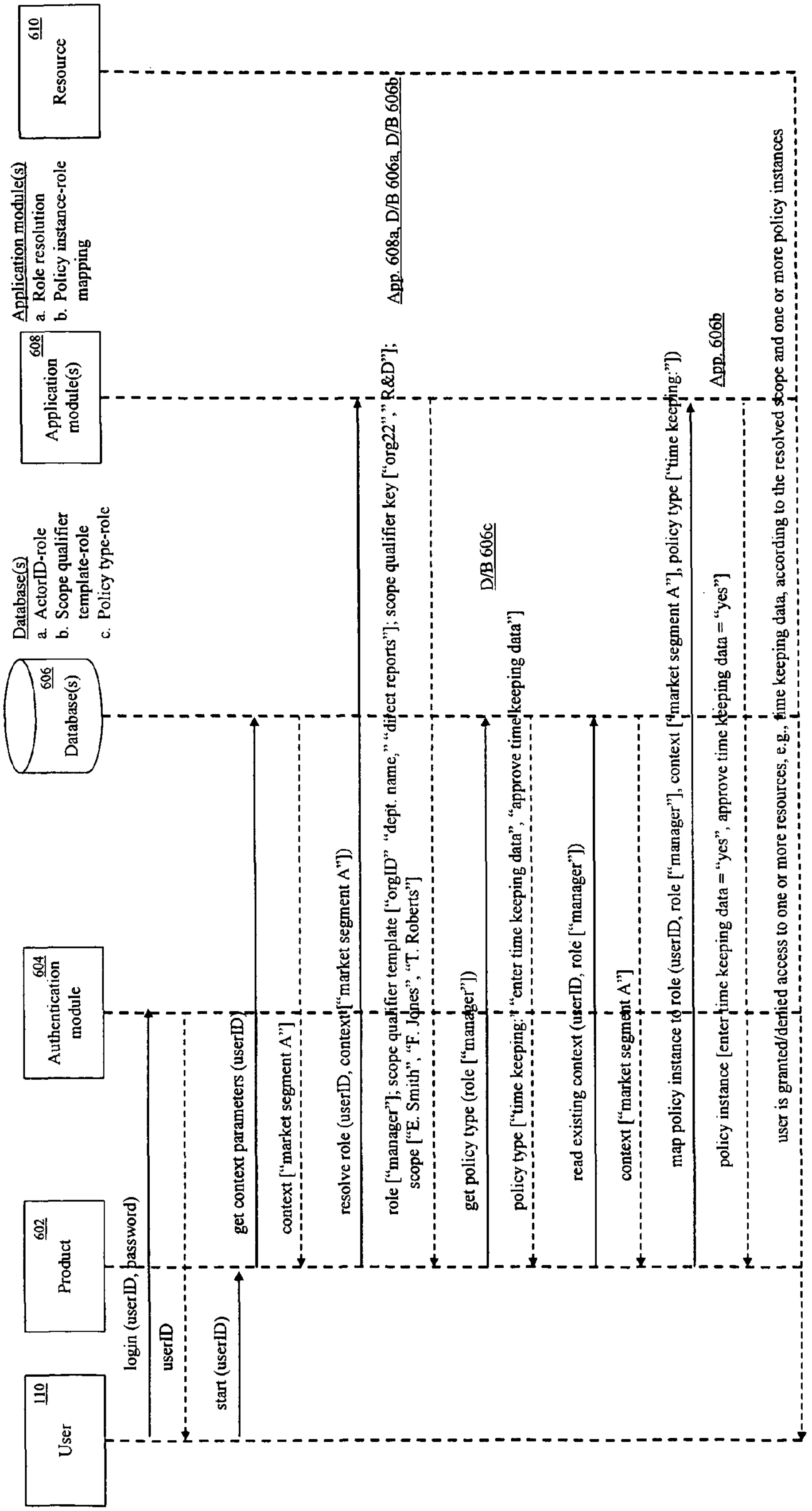
FIG. 6 is an exemplary illustration for role-based access in a multi-customer computing environment.

FIG. 6 is an exemplary illustration for role-based access 600 in a multi-customer computing environment. A user 110 (one type of actor) logs on to a computer system by providing, for example, a userID and password, and attempts interaction with one or more product modules 602. A product module 602 can represent one or more applications with which a user 110 attempts interaction. The identity of the user 110 is established through an authentication module 604 using the authentication credentials that the user 110 inputs into the system. If the user 110 is authenticated by the authentication module 604, then one or more pre-defined context parameters are obtained, e.g., "market segment A." Context parameters can be, for example, cached or obtained from existing databases within, for example, one or more recordkeeping systems. The illustrated communications can be performed using one or more standards-based languages and protocols, such as SOAP, HTTP, IP, SQL, and the like.

A user 110 is assigned to a role based on, for example, the identity of the user and the one or more pre-defined context parameters. Role assignment can be accomplished, for example, by a role resolution application module 608*a* based on values obtained from, for example, an actorID-role database 606*a*. In this example, the role of "manager" is assigned based on the userID and the "market segment A" context parameter.

A role scope can be associated with a role. Such associations can be stored, for example, in a role scope-role database 606*b*. The role scope includes a general specification of the scope associated with each role. In this example, the role of "manager" has a role scope that includes "orgID," "department name," and "direct reports." The actor-role scope key for this example includes "org22" as the orgID, and "R&D" as the department name. These actor-role scope key values can represent one or more pointers that enable the resolution of scope, which includes the populations and/or entities that a user 110 may act upon. In this example, the resolved scope represents the direct reports "E. Smith," "F. Jones," and "T. Roberts."

A policy type is associated with the role of a user 110, which can be, for example, stored in a policy type-role database 606*c*. In this example, the policy type "time keeping" is associated with the role of "manager." The "time keeping" policy type includes, for example, the "enter time keeping data," and the "approve time keeping data" policy elements.

Existing context parameters are read and/or additional context parameters are obtained in order to map one or more policy instances to a role. Based on the role of "manager," and the context parameter "market segment A," a policy instance for the policy type "time keeping" is mapped 608*b* to the "manager" role. In this example, the policy element values for "enter time keeping data" and "approve time keeping data" are both set to "yes." Based on the policy instance that was mapped 608*b* to the "manager" role, the manager in this example is authorized to enter and/or approve time keeping data for E. Smith, F. Jones, and T. Roberts.

The role and a policy instance of an access control policy element can determine what the system makes available to a given user 110. The policy instance for a data view/presentation policy element can define which aspects of a system component or entity are to be presented to a user 110. For example, a "manager" role and a "human resource specialist" role may have access to the same system components or entities, e.g., personnel information, based on the policy instance for the access control policy element (named "access personnel data") of the policy type (entitled "performance management") associated with each of their roles. The "manager," however, may have rights to view employee salaries based on the policy instance for the data view policy element (named, for example, "view personnel data") associated with the policy type (entitled, for example, "performance management") for his or her role, whereas the "human resources specialist" may not possess such rights. The instance associated with a function performance/update operation policy element can control what functions the user 110 is allowed to perform and those he or she may not perform when the user 110 interacts with the system 100. The "manager" role may, for example, be able to effect a promotion by, among other tasks, modifying the personnel data associated with an employee's title. Whereas, the "human resources specialist," having no such promotion authority, will not have modification rights to employees' titles. This distinction in update authority is based upon the different policy instances for the function performance/update operation policy elements associated with the respective policy types and roles for the "manager" and the "human resources specialist."

Figure 7:
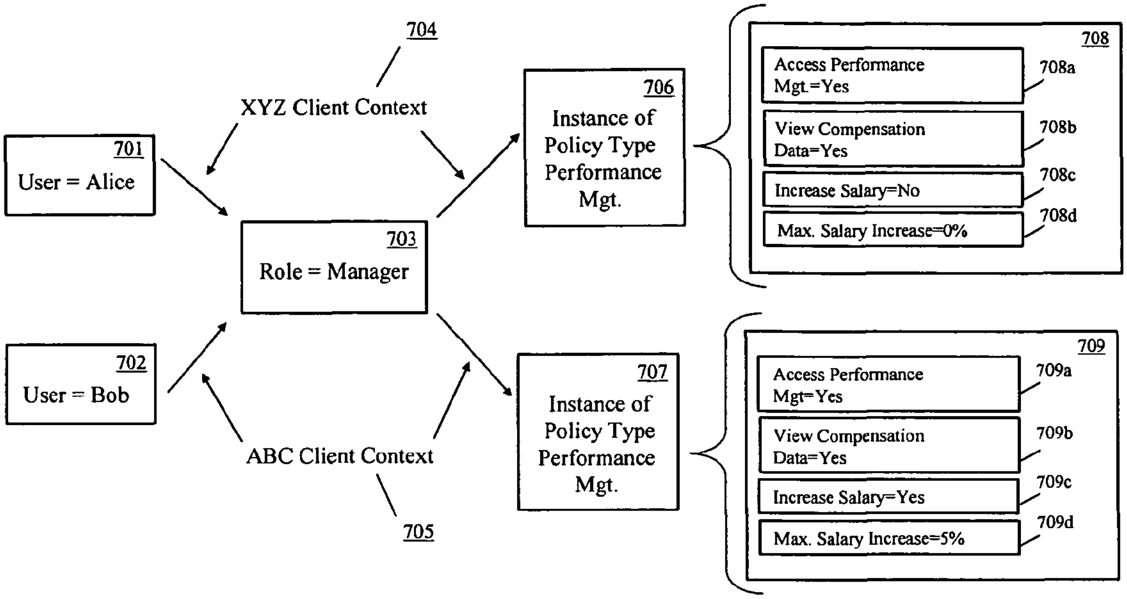
FIG. 7 is another exemplary illustration for role-based access in a multi-customer computing environment.

FIG. 7 illustrates another example in which context parameter-based roles and policy instances can determine the one or more resources that a user may be authorized to access. FIG. 7 illustrates users 110 in the role of "manager" with a policy type named "performance management" associated with their role. In this example, the role named "manager" has a pre-defined context parameter of "client." Therefore, the "client" pre-defined context parameter is required in order to assign one or more users to the role of "manager" and to determine one or more policy instances for the "performance management" policy type. In this example, the following "manager" role assignments could be included: user="Alice" 701, role="manager" 703, and context="XYZ Client" 704; and user="Bob" 702, role="manager" 703, and context="ABC Client" 705. In this example, the "performance management" policy type associated with the "manager" role includes policy elements such as "access performance management application," "view compensation data," "can increase salary," and "maximum salary increase percentage." In this example, a policy instance 706 would apply to "Alice" 701 in her "manager" role 703 based upon the "XYZ Client" pre-defined context parameter 704. A policy instance 707 would apply to "Bob" 702 in his "manager" role 703 based upon the "ABC Client" pre-defined context parameter 705. For this example, there are two policy instances, 706 and 707, for the "performance management" policy type. In this example, the following "performance management" policy instances are illustrated for the role of "manager" 703: user="Alice" 701, "context="XYZ Client" 704, access performance management application="yes" 708*a*, view compensation data="yes" 708*b*, can increase salary="no" 708*c*, and maximum salary increase percentage="0%" 708*d*; and user="Bob" 702, context="ABC Client" 705, access performance management application="yes" 709*a*, view compensation data="yes" 709*b*, can increase salary="yes" 709*c*, and maximum salary increase percentage="5%" 709*d*. In this example, although both users, "Bob" 702 and "Alice" 701, have the same role 703, the pre-defined context parameter values of the role assignment for each of them differs. As a result, the policy instances for each user will differ, and in turn, view, access, and update permissions will differ for "Bob" 702 and "Alice" 701, even though they both are associated with the role of "manager" 703. In this example, Bob, as a manager within the ABC Client organization, can increase salaries by no more than 5%; whereas, Alice, as a manager within the XYZ Client organization, cannot increase salaries.

As has been illustrated, the creation of one or more policy instances, associated with the role of a user, one or more pre-defined context parameters, and one or more policy types, can provide for the contextual customization and determination of access rights to one or more resources for different users with the same role.

The code that follows is exemplary of the method described in FIG. 3 for role-based access in a multi-customer computing environment. In this example, a user 110 named "Inga," who is an independent contractor, logs on to a computer system 301. Inga's identity is authenticated 302 by an authentication module using the authentication credentials that the user 110, Inga, input into the system. In this example, Inga's identity is authenticated and she is assigned a role (Role AssignmentID="E1"), which, for this example, is the role of "CSS Rep." Based on the Role AssignmentID of "E1," context parameters are obtained 303. For this example, organizational context parameters (OrgContext ContextID="C") are passed back, including the "DC" practice context parameter, and the "ECM" market segment context parameter. In this example, no specific values for the client context parameter and the plan context parameter are set. In this example, the client and plan context parameters can be variable. One or more policy instances, for this example, can be resolved based upon the context parameters requested by the consuming application. For this example, as part of the "resolve role" process 304, a actor-role scope key or pointer value of "FPRS" is set so that the scope for Inga's role can be resolved.

```
<GetRoles>
  <Identity>Inga</Identity>
</GetRoles>
<GetRolesResponse>
  <Identity>Inga</Identity>
  <Roles>
    <Role AssignmentID="E1">
      <RoleName>CSS Rep</RoleName>
      <OrgContext ContextID="C">
        <Practice value="DC">
          <MarketSegment value="ECM">
            <Client value="*">
              <Plan value="*"/>
            </Client>
          </MarketSegment>
        </Practice>
      </OrgContext>
      <ScopeQualifier>
        <ScopeResolver>FPRS</ScopeResolver>
        <Qualifier>
          <Practice value="DC"/>
          <MarketSegment value="ECM"/>
          <Client value="All except XYZ"/>
          <Plan value="All except XYZ plans"/>
          <Division value="All except XYZ executives"/>
        </Qualifier>
      </ScopeQualifier>
    </Role>
  </Roles>
</GetRolesResponse>
```

In this example, session context parameters are retrieved, including the "BWS" application value context parameter, the "PSG" point of claim context parameter, and the authentication credential strength context parameter of "5." In this example, based on the role of the user 110, "Inga," the session context parameters, e.g., "BWS," "PSG," and "5," and the organizational context parameters associated with OrgContext ContextID "C," one or more policy instances are retrieved. In this example, policy instances are retrieved that include, instances of the policy type "performance management" (PolicyInstance InstanceID "15"), policy type "timekeeping functions" (PolicyInstance InstanceID "16"), and policy type "DC transactions" (PolicyInstance InstanceID "19"). Each of the unique policy instances for this example, contain a set of policy elements with values that can aid in the determination of user access authorizations. For example, according to PolicyInstance InstanceID "16," which includes a policy element "enter timekeeping data" that is set to "N," the user 110, "Inga," cannot enter timekeeping data given that she is an independent contractor.

```
<GetPolicySet>
  <RoleAssignmentID>E1/RoleAssignmentID>
  <Context>
    <SessionContext>
      <Application value="BWS">
        <PointOfClaim value="PSG">
          <AuthStrength value="5"/>
        </PointOfClaim>
      </Application>
    </SessionContext>
    <OrgContext ContextID="C">
      <Practice value="DC">
        <MarketSegment value="ECM">
          <Client value="Mom's Apple Pie">
            <Plan value="95135"/>
          </Client>
        </MarketSegment>
      </Practice>
    </OrgContext>
  </Context>
</GetPolicySet>
```

```
<GetPolicySetResponse>
  <Identity>Inga</Identity>
  <RoleName>CSS Rep</RoleName>
  <Context>
    <SessionContext>
      <Application value="BWS">
        <PointOfClaim value="PSG">
          <AuthStrength value="5"/>
        </PointOfClaim>
      </Application>
    </SessionContext>
    <OrgContext ContextID="C">
      <Practice value="DC">
        <MarketSegment value="ECM">
          <Client value="Mom's Apple Pie">
            <Plan value="95135"/>
          </Client>
        </MarketSegment>
      </Practice>
    </OrgContext>
  </Context>
  <PolicySet>
    <PolicyInstance InstanceID="15">
      <PolicyTypeName>Performance management</PolicyTypeName>
      <PolicyElements>
        <PolicyElement Name="Set performance
objectives">N</PolicyElement>
        <PolicyElement Name="Review performance
objectives">Y</PolicyElement>
        <PolicyElement Name="Submit merit
review">N</PolicyElement>
        <PolicyElement Name="View merit
review">Y</PolicyElement>
        <PolicyElement Name="Submit bonus
review">N</PolicyElement>
        <PolicyElement Name="View bonus
review">N</PolicyElement>
      </PolicyElements>
    </PolicyInstance>
    <PolicyInstance InstanceID="16">
      <PolicyTypeName>Timekeeping functions</PolicyTypeName>
      <PolicyElements>
        <PolicyElement Name="Enter timekeeping
data">N</PolicyElement>
        <PolicyElement Name="Review timekeeping
data">Y</PolicyElement>
        <PolicyElement Name="Approve timekeeping
data">N</PolicyElement>
        <PolicyElement Name="Adjust timekeeping
data">Y</PolicyElement>
      </PolicyElements>
    </PolicyInstance>
    <PolicyInstance InstanceID="19">
```

-continued

<PolicyTypeName>DC transactions</PolicyTypeName>
<PolicyElements>
<PolicyElement Name="View account balances">Y</PolicyElement>
<PolicyElement Name="Exchange between funds">Y</PolicyElement>
<PolicyElement Name="Submit loan">N</PolicyElement>
<PolicyElement Name="Change address">Y</PolicyElement>
<PolicyElement Name="Upload deferral funding">N</PolicyElement>
<PolicyElement Name="Rollover into account">Y</PolicyElement>
</PolicyElements>
</PolicyInstance>
</PolicySet>
</GetPolicySetResponse>

References to "resources" set forth herein include, for example, databases, system applications, documents, and/or the like. The term "instance" as disclosed herein is not limited to the concept of instantiation as is defined in object oriented technologies. Although databases are referred to in many examples herein, the invention is not limited to this form of data storage. Other forms of data stores and storage formats can also be used, such as text files, file trees, spreadsheets, and/or the like.

The techniques described herein can be implemented in digital electronic circuitry, or in computer hardware, firmware, software, or in combination of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stoned-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described processes can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and can interact through a communication network. The relationship of client and server arises by virtue of computer programs running on the respective computers and having a client-server relationship to each other.

The invention has been described in terms of particular embodiments. The alternatives described herein are examples for illustration only and are not to limit the alternatives in any way. The steps of the invention can be performed in a different order and still achieve desirable results. Other embodiments are within the scope of the following claims.

What is claimed is:

1. A method for managing role-based access in a multi-customer computing environment, the method comprising:

receiving, by a computing device, a request from an actor to take action within the multi-customer computing environment;

determining, by the computing device, a role from one or more roles for the actor based on an identification of the actor, wherein each role is assigned a plurality of context parameters, each role is used by a plurality of customers, and the role that is determined can have a first policy element for the actor and a second policy element for a different actor, the first policy element and the second policy element are not the same;

receiving, by the computing device, one value for each of the one or more context parameters assigned to the role based on the identification of the actor;

determining, by the computing device, a role scope for the role based on the one value of each of the one or more context parameters assigned to the actor;

determining, by the computing device, an actor-role scope value based on the role scope and the one value of each of the one or more context parameters assigned to the role;

determining, by the computing device, a policy type based on the request from the actor and the actor's role and the one or more context parameters assigned to actor;

populating, by the computing device, policy elements of the policy type to form a policy instance with one or more values from the one or more context parameters assigned to the role; and providing to the actor, by the computing device, an access permission for the first policy element or the second policy element so the actor can take action within the multi-customer computing environment based on the policy instance.

2. The method of claim 1, further comprising generating, by the computing device, a role assignment record.

3. The method of claim 2, wherein the role assignment record comprises the actor, the role, and the context parameters.

4. The method of claim 2, wherein the role assignment record comprises the one or more actor-role scope values based on the role scope.

5. The method of claim 1, wherein the request comprises a request to access a database, a system application, a document, or any combination thereof.

6. The method of claim 1, wherein said actor comprises a user, a system account, a system application, a computing device, or any combination thereof.

7. The method of claim 1 wherein the policy type includes an access control policy element, a data view/presentation policy element, a function performance/update operation policy element, or any combination thereof.

8. The method of claim 1 wherein determining the policy instance comprises employing a hierarchical priority of the one or more of the context parameters.

9. The method of claim 1 comprising defining, by the computing device, a default policy instance.

10. The method of claim 9 wherein determining the policy instance comprises selecting the default policy instance when there is no match with the one or more of the context parameters.

11. The method of claim 1 wherein the one or more context parameters constrains the role scope and the policy type.

12. The method of claim 1 wherein determining a role scope for the role further comprises selecting the role scope from a set of role scopes that are available for the role.

13. A system for managing role-based access in a multi-customer computing environment, the system comprising:

one or more servers configured to:

receive a request from an actor to take action within the multi-customer computing environment;

determine a role from one or more roles for the actor based on an identification of the actor, wherein each role is assigned a plurality of context parameters, each role is used by a plurality of customers, and the role that is determined can have a first policy element for the actor and a second policy element for a different actor, the first policy element and the second policy element are not the same;

receive one value for each of the one or more context parameters assigned to the role based on the identification of the actor;

determine a role scope for the role based on the one value of each of the one or more context parameters assigned to the actor;

determine an actor-role scope value based on the role scope and the one value of each of the one or more context parameters assigned to the role;

determine a policy type based on the request from the actor and the actor's role and the one or more context parameters assigned to actor;

populate policy elements of the policy type to form a policy instance with one or more values from the one or more context parameters assigned to the role; and provide to the actor an access permission for the first policy element or the second policy element so the actor can take action within the multi-customer computing environment based on the policy instance.

14. The system of claim 13, wherein the one or more servers are further configured to generate a role assignment record.

15. The system of claim 14, wherein the role assignment record comprises the actor, the role, and the context parameters.

16. The system of claim 14, wherein the role assignment record comprises the one or more actor-role scope values based on the role scope.

17. The system of claim 13, wherein said resource comprises a database, a system application, a document, or any combination thereof.

18. The system of claim 13, wherein said actor comprises a user, a system account, a system application, a computing device, or any combination thereof.

19. The system of claim 13, wherein the policy type includes an access control policy element, a data view/presentation policy element, a function performance/update operation policy element, or any combination thereof.

20. A computer program product, tangibly embodied in a non-transitory machine-readable storage device, for managing role-based access in a multi-customer computing environment, the computer program product including instructions being operable to cause data processing apparatus to:

receive a request from an actor to take action within the multi-customer computing environment;

determine a role from one or more roles for the actor based on an identification of the actor, wherein each role is assigned a plurality of context parameters, each role is used by a plurality of customers, and the role that is determined can have a first policy element for the actor and a second policy element for a different actor, the first policy element and the second policy element are not the same;

receive one value for each of the one or more context parameters assigned to the role based on the identification of the actor;

determine a role scope for the role based on the one value of each of the one or more context parameters assigned to the actor;

determine an actor-role scope value based on the role scope and the one value of each of the one or more context parameters assigned to the role;

determine a policy type based on the request from the actor and the actor's role and the one or more context parameters assigned to actor;

populate policy elements of the policy type to form a policy instance with one or more values from the one or more context parameters assigned to the role; and provide to the actor an access permission for the first policy element or the second policy element so the actor can take action within the multi-customer computing environment based on the policy instance.

* * * * *

UNITED STATES PATENT AND TRADEMARK OFFICE

CERTIFICATE OF CORRECTION

PATENT NO. : 8,336,078 B2
APPLICATION NO. : 11/484842
DATED : December 18, 2012
INVENTOR(S) : Royyuru Dixit et al.

It is certified that error appears in the above-identified patent and that said Letters Patent is hereby corrected as shown below:

In the Claims

In claim 1, Col. 17, line 6 delete "policy element or the second" and replace it with --policy element of the second--.

Signed and Sealed this
Twenty-third Day of April, 2013

Teresa Stanek Rea
*Acting Director of the United States Patent and Trademark Office*

UNITED STATES PATENT AND TRADEMARK OFFICE

CERTIFICATE OF CORRECTION

PATENT NO. : 8,336,078 B2
APPLICATION NO. : 11/484842
DATED : December 18, 2012
INVENTOR(S) : Royyuru Dixit et al.

It is certified that error appears in the above-identified patent and that said Letters Patent is hereby corrected as shown below:

On the Title page, item [73] Assignee delete “FMR Corp.” and replace it with --FMR LLC--.

Signed and Sealed this
Twenty-seventh Day of August, 2013

Teresa Stanek Rea
*Acting Director of the United States Patent and Trademark Office*